US012644502B2

(12) United States Patent
Voges et al.

(10) Patent No.: US 12,644,502 B2
(45) Date of Patent: *Jun. 2, 2026

(54) REVERSE DRIVE SYSTEM FOR A MOTORIZED VEHICLE

(71) Applicant: Harley-Davidson Motor Company, Inc., Milwaukee, WI (US)

(72) Inventors: Johann Voges, Brookfield, WI (US); Karl Monis, Hartland, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/041,907

(22) Filed: Jan. 30, 2025

(65) Prior Publication Data

US 2025/0172195 A1 May 29, 2025

Related U.S. Application Data

(62) Division of application No. 18/331,036, filed on Jun. 7, 2023, now Pat. No. 12,398,786.

(51) Int. Cl.
    *F16H 3/00*     (2006.01)
    *B62M 11/06*     (2006.01)
    (Continued)

(52) U.S. Cl.
    CPC ............. *F16H 3/089* (2013.01); *B62M 11/06* (2013.01); *B62M 23/02* (2013.01); (Continued)

(58) Field of Classification Search
    CPC . F16H 3/006; F16H 3/089; F16H 3/14; F16H 2003/0082; B62M 11/06; B62M 23/02; F02N 11/0851; B60K 2006/541
    See application file for complete search history.

(56) References Cited

U.S. PATENT DOCUMENTS

| | | | |
|---|---|---|---|
| 3,872,738 A | 3/1975 | Price et al. | |
| 4,410,071 A | 10/1983 | Osterman | |

(Continued)

FOREIGN PATENT DOCUMENTS

| | | |
|---|---|---|
| CN | 107166028 A | 9/2017 |
| CN | 117799743 A | 4/2024 |

(Continued)

OTHER PUBLICATIONS

YamahaDTCanadaServic, "13 Sure Park," <https://www.youtube.com/watch?v=ul9Mv3jAPJs> YouTube video dated Sep. 26, 2017, [relevant portions at 0:33, 0:41, 0:46, 0:51, 0:55, 1:01] (3 pages).

(Continued)

*Primary Examiner* — William C Joyce
(74) *Attorney, Agent, or Firm* — Michael Best & Friedrich LLP

(57) ABSTRACT

A motorized vehicle includes a multi-speed transmission having a plurality of forward gears configured to be selectively engaged to drive the motorized vehicle, an internal combustion engine selectively coupled to the transmission, and a reverse drive system selectively coupled to the transmission to provide torque to drive the motorized vehicle in a reverse direction. The reverse drive system includes an electric motor and a reverse drive gear train configured to be selectively coupled to the transmission. The transmission includes a neutral position in which the internal combustion engine is decoupled from the transmission and freely rotatable relative to the transmission. The reverse drive gear train is configured to be operably coupled to the transmission when the transmission is in the neutral position, such that the reverse drive system is operable to drive the motorized vehicle in the reverse direction without interference from the internal combustion engine.

11 Claims, 11 Drawing Sheets

(51) Int. Cl.

| | |
|---|---|
| *B62M 23/02* | (2010.01) |
| *F02N 11/08* | (2006.01) |
| *F16H 3/089* | (2006.01) |
| *F16H 61/28* | (2006.01) |
| *F16H 3/08* | (2006.01) |

(52) U.S. Cl.
CPC ......... *F02N 11/0851* (2013.01); *F16H 3/006* (2013.01); *F16H 61/2807* (2013.01); *F16H 2003/007* (2013.01); *F16H 2003/0822* (2013.01); *F16H 2061/2853* (2013.01)

(56) References Cited

U.S. PATENT DOCUMENTS

| | | | |
|---|---|---|---|
| 4,763,538 | A | 8/1988 | Fujita et al. |
| 4,827,148 | A | 5/1989 | Hirosawa et al. |
| 5,036,939 | A | 8/1991 | Johnson et al. |
| 5,845,546 | A | 12/1998 | Knowles et al. |
| 5,971,123 | A | 10/1999 | Ochab et al. |
| 6,209,697 | B1 | 4/2001 | Austin |
| RE38,012 | E | 3/2003 | Ochab et al. |
| 6,622,837 | B2 | 9/2003 | Ochab et al. |
| 6,629,590 | B2 | 10/2003 | Ochab et al. |
| 6,708,579 | B2 | 3/2004 | Punko |
| 6,722,484 | B2 | 4/2004 | Ochab et al. |
| 7,141,162 | B2 | 11/2006 | Garner et al. |
| 7,610,979 | B1 | 11/2009 | Dykowski et al. |
| 7,952,305 | B2 | 5/2011 | Fischer et al. |
| 8,001,862 | B2 | 8/2011 | Albulushi et al. |
| 8,677,860 | B2 | 3/2014 | Nishida et al. |
| 8,840,514 | B1 | 9/2014 | Knickerbocker et al. |
| 8,857,294 | B2 | 10/2014 | Brewer et al. |
| 8,857,589 | B2 | 10/2014 | Heath et al. |
| 8,919,513 | B2 | 12/2014 | Heath et al. |
| 8,926,467 | B2 | 1/2015 | Grant |
| 9,022,195 | B2 | 5/2015 | Heath et al. |
| 9,272,620 | B2 | 3/2016 | Knickerbocker et al. |
| 9,360,059 | B2 | 6/2016 | Palmer et al. |
| 9,856,930 | B2 | 1/2018 | Heath et al. |
| 10,457,140 | B2 | 10/2019 | Bennett et al. |
| 10,989,258 | B1 | 4/2021 | Coon et al. |
| 11,047,464 | B2 | 6/2021 | Hamrin et al. |
| 11,097,609 | B2 | 8/2021 | Matsuda et al. |
| 11,131,350 | B1 | 9/2021 | Palmer |
| 11,236,811 | B1 | 2/2022 | Hasson, Jr. et al. |
| 11,364,788 | B2 | 6/2022 | Ge et al. |
| 11,421,769 | B2 | 8/2022 | Heath et al. |

| | | | |
|---|---|---|---|
| 2006/0266611 | A1 | 11/2006 | Updyke et al. |
| 2009/0199666 | A1 | 8/2009 | Yang et al. |
| 2010/0077884 | A1 | 4/2010 | Ono et al. |
| 2019/0291567 | A1 | 9/2019 | Huang et al. |
| 2020/0062105 | A1 | 2/2020 | Ge et al. |
| 2023/0106079 | A1 | 4/2023 | Fertilio |

FOREIGN PATENT DOCUMENTS

| | | |
|---|---|---|
| CN | 117799744 A | 4/2024 |
| CN | 117799745 A | 4/2024 |
| CN | 117799747 A | 4/2024 |
| CN | 117842249 A | 4/2024 |
| CN | 117842252 A | 4/2024 |
| CN | 222474372 U | 2/2025 |
| DE | 102009058133 B4 | 6/2020 |
| DE | 102020006375 A1 | 4/2022 |
| EP | 1491764 A2 | 12/2004 |
| GB | 2079877 A | 1/1982 |
| JP | 2014108636 A | 6/2014 |
| WO | 2020089766 A1 | 5/2020 |
| WO | 2023095057 A1 | 6/2023 |

OTHER PUBLICATIONS

TechnoLogic, "Honda Goldwing: How to Reverse Correctly," <https://www.youtube.com/watch?v=igtirPnq8pE> YouTube video dated Dec. 28, 2017 [relevant portions at 0:27, 0:40, 1:05, 1:12] (3 pages).

Team Winnebagoland, "How To Use Sure Park Assist 2018 Yamaha Star Venture Transcontinental Touring Option," <https://www.youtube.com/watch?v=vvc23thZg-E> YouTube video dated Dec. 29, 2017 [relevant portions at 0:25, 0:26, 0:30] (3 pages).

913 BOY, "Honda Goldwing Reverse Gear," <https://www.youtube.com/watch?v=gFMcdvG9c_s> YouTube video dated Jun. 5, 2021 [relevant portions at 0:09, 0:12] (2 page).

BMW K1600 Forum, "Do NOT use reverse!" <https://www.k1600forum.com/threads/do-not-use-reverse.162106/page-6> forum post dated Sep. 29, 2017 (10 pages).

Baker Drivetrain, "Baker Factory 5 Speed Reverse," F5R Installation Instructions, dated Dec. 3, 2018 (28 pages).

Baker Drivetrain, "F6R Factory 6-Speed Reverse System," F6R Transmission Kit Information dated May 11, 2021 (36 pages).

European Patent Office Extended Search Report for Application No. 24179632.5 dated Nov. 15, 2024 (10 pages).

European Patent Office Extended Search Report for Application No. 25160230.6 dated Jun. 6, 2025 (10 pages).

European Patent Office Extended Search Report for Application No. 25160221.5 dated Jun. 6, 2025 (9 pages).

REVERSE DRIVE SYSTEM FOR A MOTORIZED VEHICLE

CROSS-REFERENCE TO RELATED APPLICATIONS

The present application is a divisional of and claims priority to co-pending U.S. patent application Ser. No. 18/331,036, filed Jun. 7, 2023, the entire contents of which are incorporated by reference herein.

BACKGROUND

The present disclosure relates to motorized vehicles, such as two or three wheeled motorcycles, and more particularly to parking assist drive systems for motorized vehicles. Some motorized vehicles are relatively large and heavy. The size and weight of these vehicles may make it difficult for an operator to manually move the vehicle. As a result, these vehicles may be provided with a parking assist drive system, such as a reverse drive system, operably to propel the vehicle in a reverse direction at relatively slow speeds.

SUMMARY

In one aspect, a motorized vehicle includes a multi-speed transmission including a shaft supporting a plurality of forward gears, a reverse drive system operably coupled to the multi-speed transmission, and a clutch disposed between the reverse drive system and the multi-speed transmission. The reverse drive system includes a driven gear coupled to an end of the shaft, the driven gear supported for rotation about a longitudinal axis of the shaft, and a drive gear coupled to the driven gear, the drive gear configured to be rotated by an electric motor to impart rotation on the driven gear. The clutch includes an adapter secured to the end of the shaft for co-rotation with the shaft, and a dog ring secured to the adapter for co-rotation with the adapter. The dog ring being axially movable along the adapter and having a plurality of dog teeth. The driven gear includes a plurality of dog recesses configured to be engaged by the dog teeth. The clutch is movable between a disengaged position, in which the dog ring is positioned along the adapter such that the dog teeth are spaced from the dog recesses, and an engaged position, in which the dog ring is positioned along the adapter such that the dog teeth are disposed within the dog recesses. The driven gear is freely rotatable relative to the shaft when the clutch is in the disengaged position. The driven gear is coupled for co-rotation with the shaft, and the reverse drive system is configured to rotate the shaft in a reverse direction when the clutch is in the engaged position.

In another aspect, a powertrain for a motorized vehicle includes an internal combustion engine configured to drive the motorized vehicle in a forward direction, a transmission operably coupled to the internal combustion engine to receive torque from the internal combustion engine, a reverse drive system configured to drive the motorized vehicle in a reverse direction, opposite the forward direction, and a clutch. The transmission includes an input shaft configured to receive torque from the internal combustion engine, and an idler shaft having a plurality of gears configured to be meshed with the input shaft. The plurality of gears are configured to provide a plurality of selectable forward gear ratios for the motorized vehicle. The reverse drive system includes an electric motor configured to drive the motorized vehicle in the reverse direction, a drive gear coupled to the electric motor, and a driven gear configured to be operably coupled to the drive gear. The driven gear is configured to be selectively rotationally coupled to the transmission. The clutch is operably coupled to the driven gear and to the idler shaft of the transmission. The clutch is movable between a disengaged position, in which the driven gear is freely rotatably relative to the idler shaft, and an engaged position, in which the driven gear is coupled for co-rotation with the idler shaft such that the electric motor of the reverse drive system is configured to rotate the idler shaft in a reverse direction.

In yet another aspect, a motorized vehicle includes a multi-speed transmission operably coupled to a drive wheel of the motorized vehicle, the multi-speed transmission including a plurality of forward gears configured to be selectively engaged to drive the motorized vehicle at a selected gear ratio, an internal combustion engine selectively coupled to the multi-speed transmission and configured to provide torque to the multi-speed transmission to drive the motorized vehicle in a forward direction at a selected gear ratio, and a reverse drive system selectively coupled to the multi-speed transmission and configured to provide torque to the multi-speed transmission to drive the motorized vehicle in a reverse direction. The reverse drive system includes an electric motor and a reverse drive gear train configured to be selectively coupled to the multi-speed transmission to transfer torque from the electric motor to the drive wheel of the motorized vehicle. The multi-speed transmission includes a neutral position in which the internal combustion engine is decoupled from the multi-speed transmission and freely rotatable relative to the multi-speed transmission. The reverse drive gear train is configured to be operably coupled to the multi-speed transmission when the multi-speed transmission is in the neutral position, such that the reverse drive system is operable to drive the motorized vehicle in the reverse direction without interference from the internal combustion engine.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
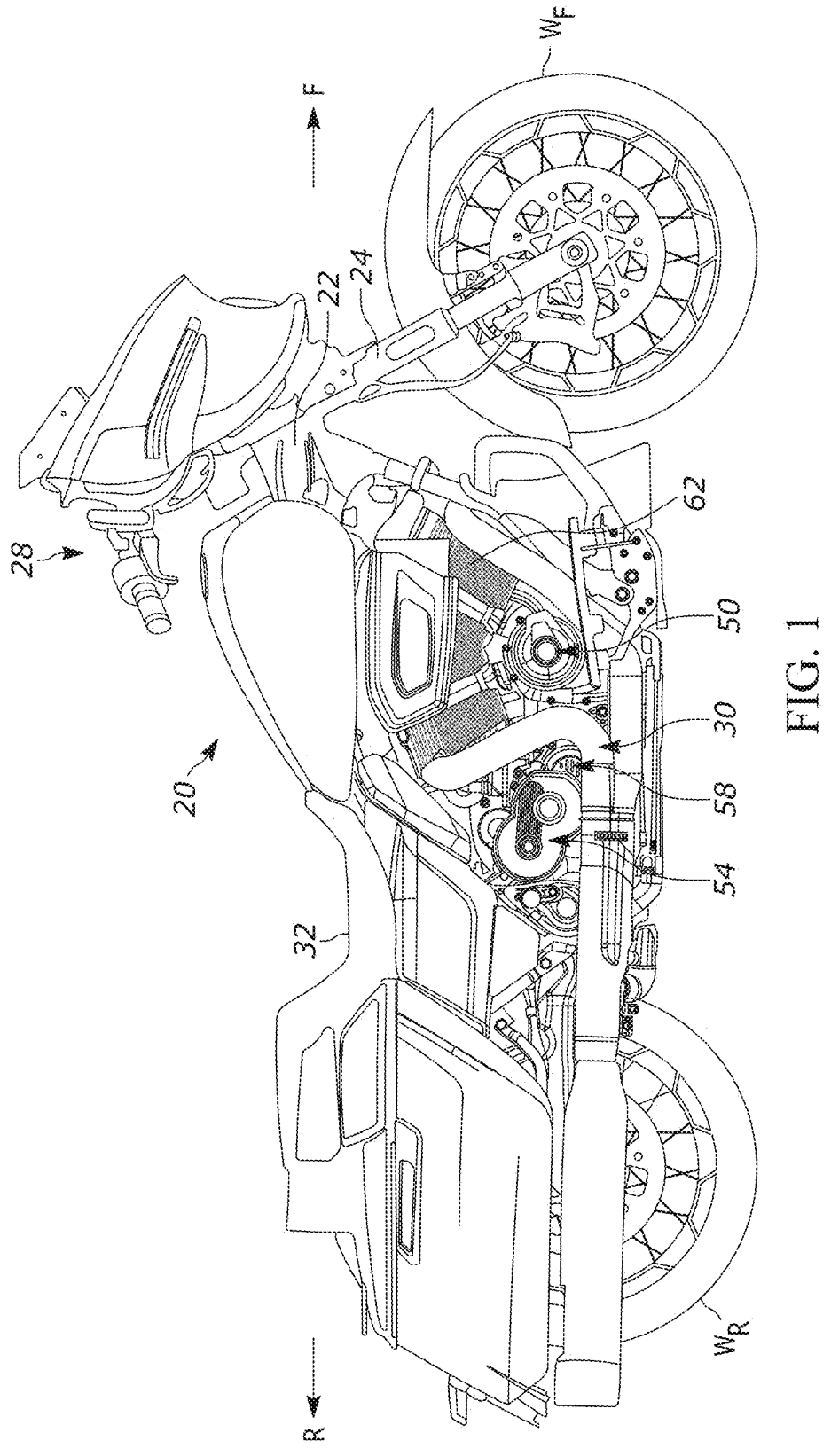
FIG. 1 is side view of a motorized vehicle according to an embodiment of the present disclosure.

FIG. 1 illustrates a motorized vehicle in the form of a motorcycle 20 including front and rear wheels $W_F$, $W_R$ coupled to a frame 22. The front wheel $W_F$ is supported by a fork 24 including a pair of fork tubes. A steering assembly 28 includes handlebars to be grasped by an operator. The steering assembly 28 is directly coupled to the fork tubes 24 to allow the operator to steer the front wheel $W_F$ via the steering assembly 28. At least one straddle seat 32 is provided at an exposed upper surface of the motorcycle 20 for supporting the operator (e.g., rider) and optionally a passenger. The rear wheel $W_R$ is a drive wheel that receives torque from a powertrain 30 to propel the motorcycle 20. As will be described in greater detail herein, the powertrain 30 is adapted to propel the motorcycle 20 in a forward direction F and in a rearward direction R. Although illustrated as a motorcycle 20 having an open cockpit and no surrounding body, aspects of the present disclosure may be provided in alternate styles of vehicles including different two-wheeled vehicles, vehicles having three or more wheels such as a motorized trike, on or off road vehicles having two or more wheels, and vehicles that partially or fully encapsulate the operator.

Figure 2:
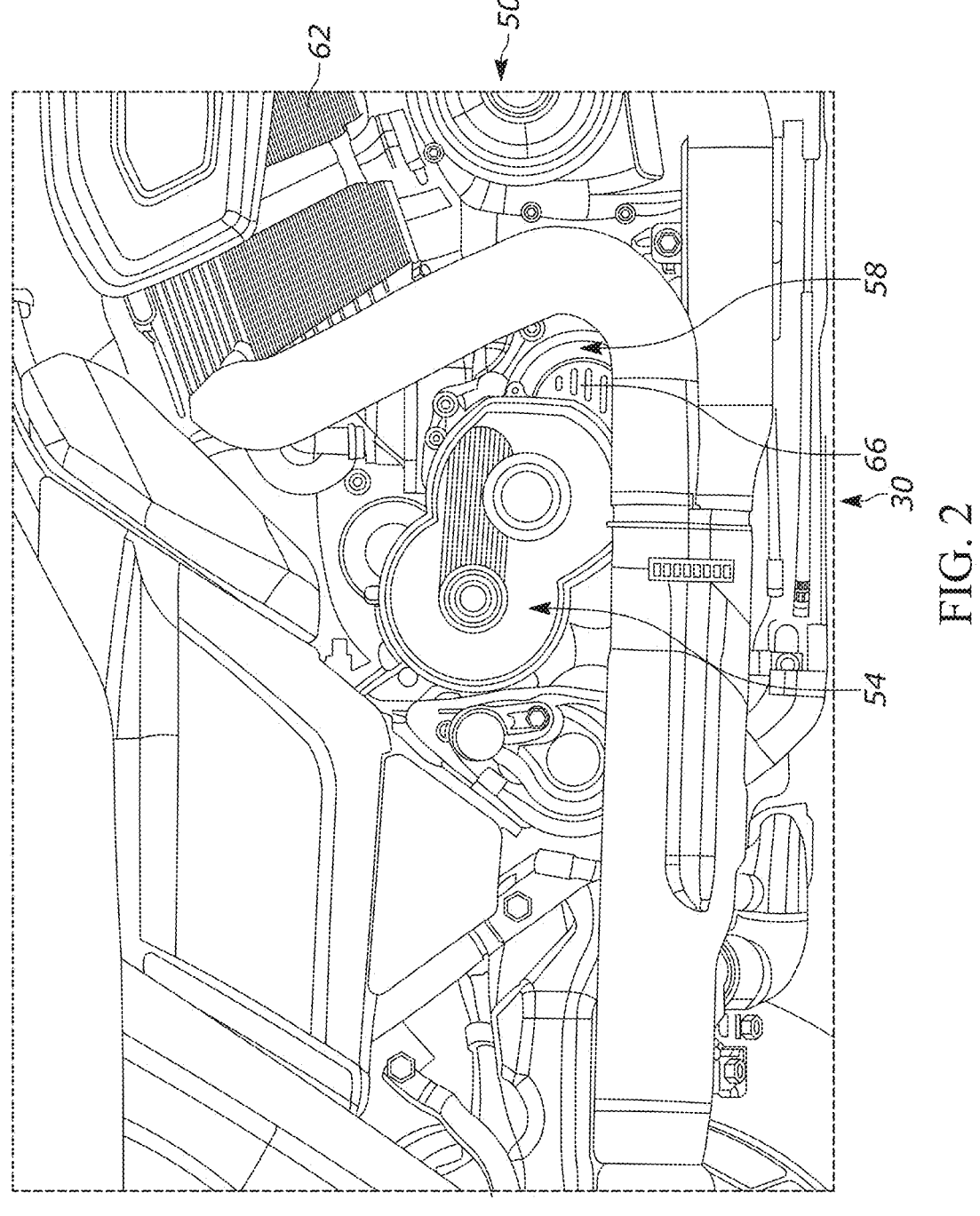
FIG. 2 is a close-up side view of a portion of the motorized vehicle of FIG. 1.
Figure 3:
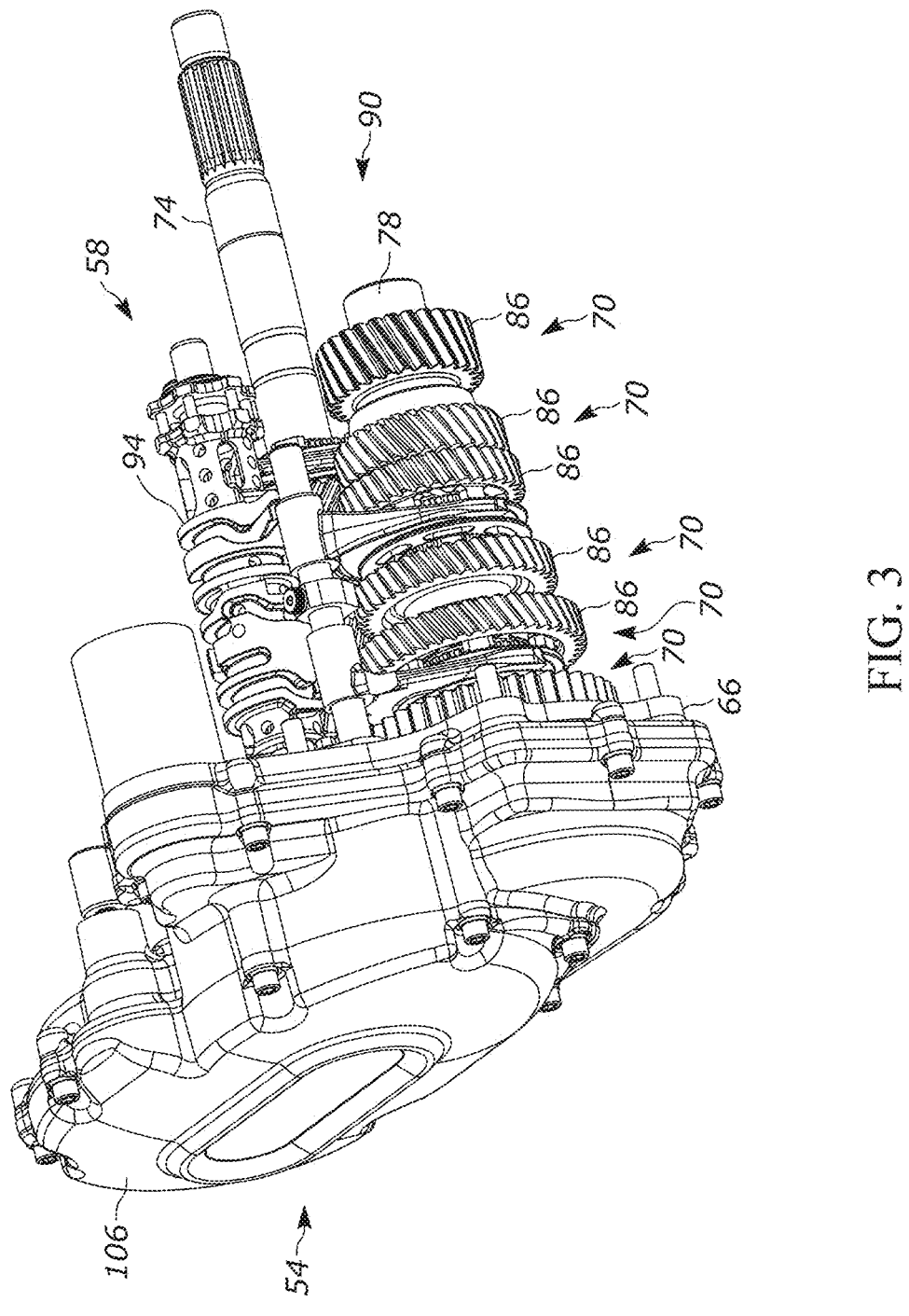
FIG. 3 is a perspective view showing internal components of a transmission of the motorized vehicle of FIG. 1.

With reference to FIGS. 1 and 2, the powertrain 30 includes a forward drive system 50, a reverse drive system 54, and a transmission 58 coupled to the forward and reverse drive systems 50, 54 and to the rear wheel $W_R$. The forward drive system 50 allows the operator to propel the motorcycle 20 in the forward direction F, and the reverse drive system 54 allows the operator to propel the motorcycle 20 in the reverse direction R. The transmission 58 is operably coupled to both the forward drive system 50 and the reverse drive system 54 to transmit torque from the drive systems 50, 54 to the rear wheel $W_R$. In the illustrated embodiment, the forward and reverse drive systems 50, 54 are coupled to the transmission 58 in a parallel power transmission pathway orientation. Thus, the motorcycle 20, which in some instances may be relatively large and heavy, does not require the operator to manually maneuver the motorcycle 20 in forward or reverse directions. Rather, the operator may utilize the forward drive system 50 to propel the motorcycle 20 in the forward direction F, and the operator may utilize the reverse drive system 54 to propel the motorcycle 20 in the reverse direction R. In some embodiments, the reverse drive system 54 is operable to propel the motorcycle 20 in the forward direction F and the reverse direction R at low speeds. Thus, the forward drive system 50 may be considered to be a high-speed or standard operating system to be used when operating the motorcycle 20 on roadways or in a traditional manner. The reverse drive system 54 may be considered to be an auxiliary or limited operating system to be used when maneuvering the motorcycle 20 in parking or other low-speed only situations.

With continued reference to FIGS. 1 and 2, the forward drive system 50 includes an internal combustion engine 62 (e.g., a gasoline burning V-twin engine). The internal combustion engine 62 generates torque to rotate the rear wheel $W_R$ in a forward direction via the transmission 58, as will be understood by one of ordinary skill in the art. The rear wheel $W_R$ in turn drives the motorcycle 20 in the forward direction. In some constructions, the forward drive system 50 is a hybrid drive that includes the internal combustion engine 62 and at least one electric machine (e.g., a rotary motor operable with electric energy to output torque, and operable in a separate mode as a generator to convert rotational kinetic energy into electric energy for consumption and/or storage). Such an electric machine may be implemented as a starter-generator, either on or spaced from a crankshaft of the internal combustion engine 62.

Figure 4:
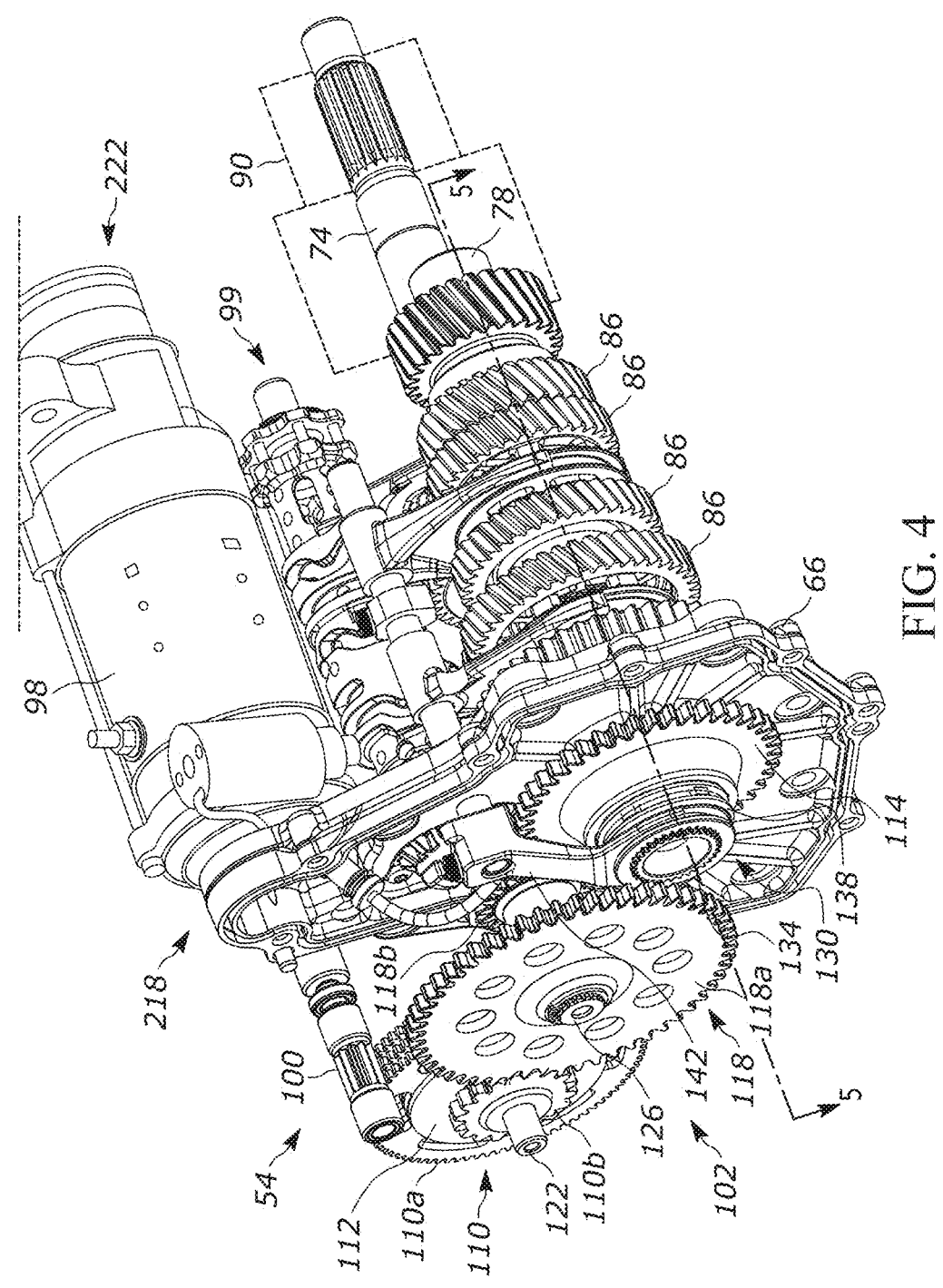
FIG. 4 is a perspective view of FIG. 3, showing internal components of a reverse drive system.
Figure 5:
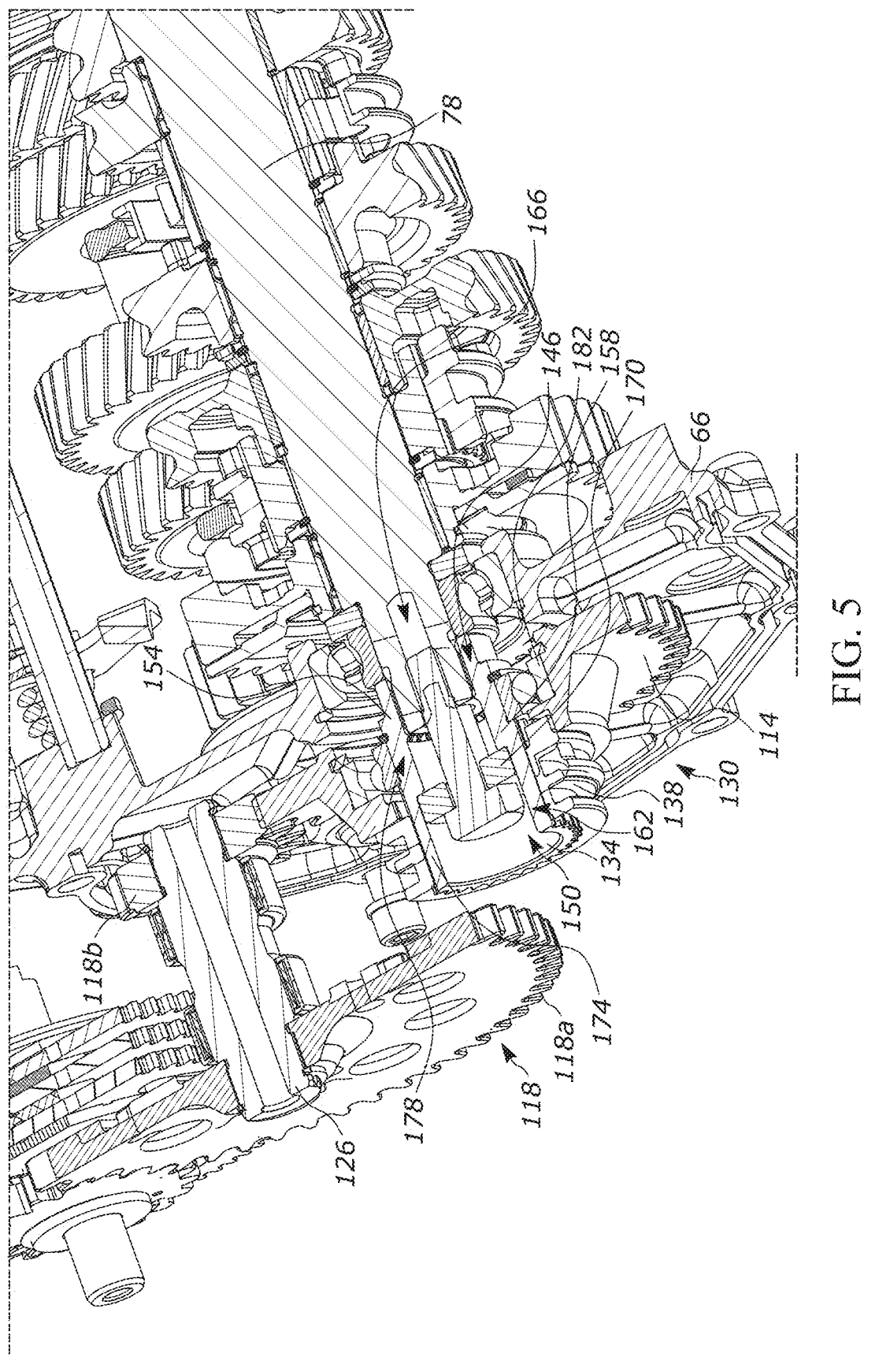
FIG. 5 is a partial cross-sectional view of FIG. 4, taken along section line 5-5 in FIG. 4.
Figure 6:
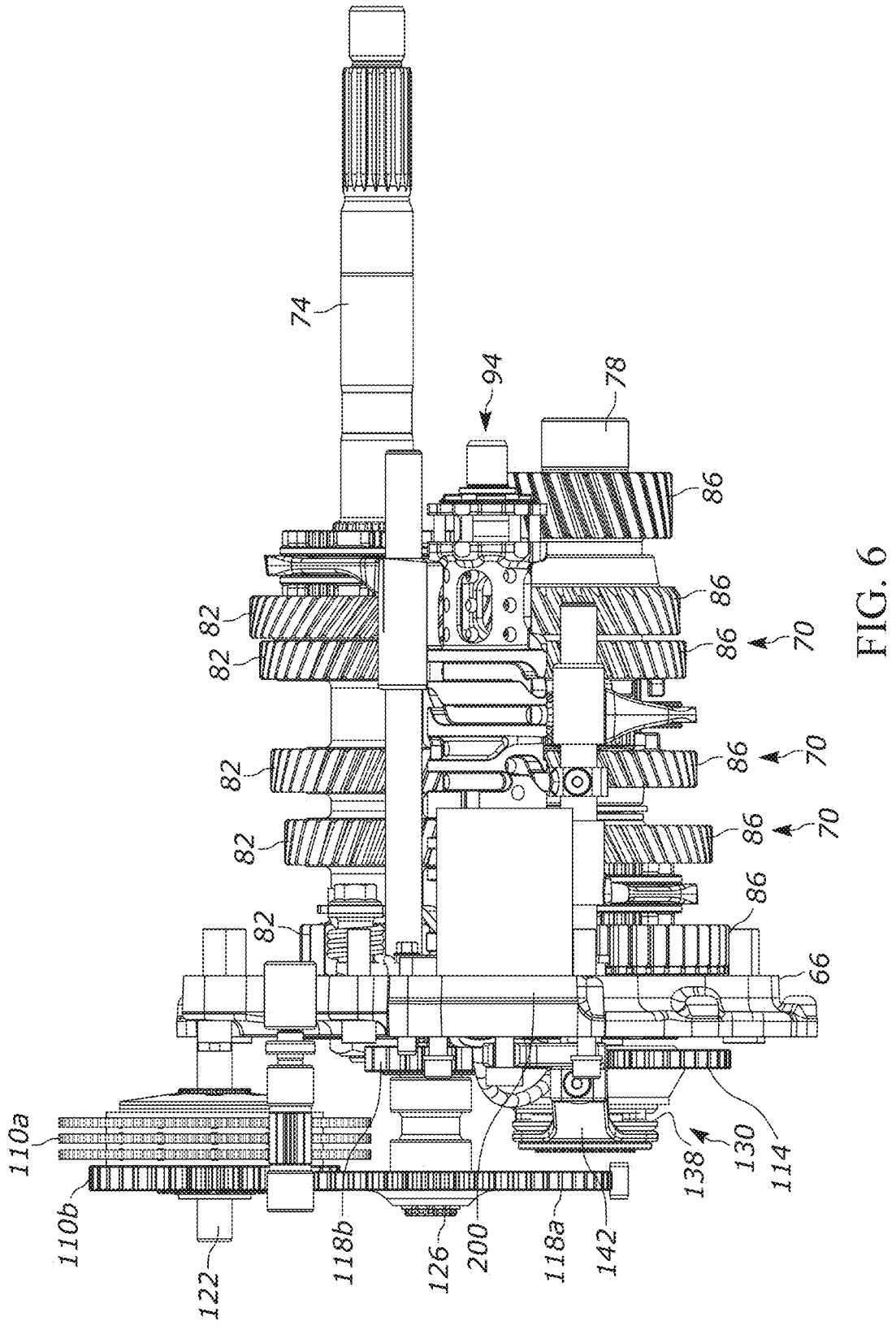
FIG. 6 is a top view of the reverse drive system FIG. 4.
Figure 7:
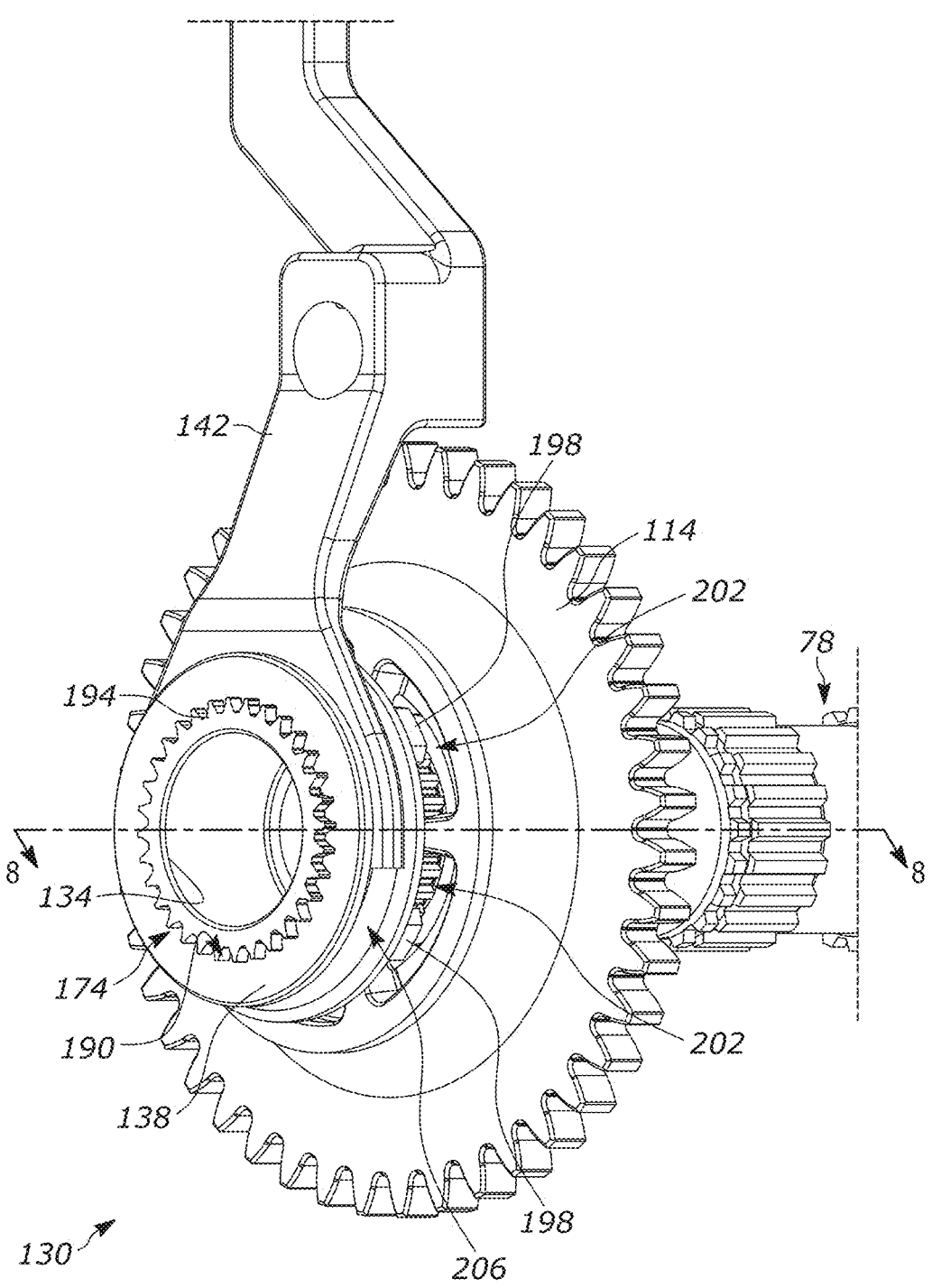
FIG. 7 is a perspective view of a clutch of the reverse drive system.

With reference to FIGS. 3-6, the transmission 58 is operably coupled to the rear wheel $W_R$ to transmit power and/or torque from the forward and reverse drive systems 50, 54 to the rear wheel $W_R$. The transmission 58 includes a transmission housing 66 (FIG. 2) and is supported by the frame 22 of the motorcycle 20. The transmission 58 of the illustrated embodiment is a multi-speed transmission having multiple gear pairs 70 disposed on parallel transmission shafts, illustrated as an input shaft 74 and an idler shaft 78, located within the transmission housing 66. For example, a transmission 58 may include six gear pairs 70 defining six distinct forward gear ratios. The transmission 58 does not include a reverse gear ratio. Within each gear pair 70, an input gear 82 is disposed on the input shaft 74 and an idler shaft gear 86 is disposed on the idler shaft 78 (FIG. 6). The input gear 82 is coupled for co-rotation with the input shaft 74 and is meshed with the idler shaft gear 86. The idler shaft gear 86 is disposed on the idler shaft 78 and is selectively securable for co-rotation with the idler shaft 78. Thus, when the idler shaft gear 86 is not secured for co-rotation with the idler shaft 78, the idler shaft gear 86 is freely rotatable relative to the idler shaft 78. The transmission 58 is operable such that, of the gear pairs 70, only one idler shaft gear 86 is capable of being secured for co-rotation with the idler shaft 78 at a time. The remainder of the idler shaft gears 86 are freely rotatable relative to the idler shaft 78 and do not transmit torque to the idler shaft 78. In some embodiments, the transmission 58 further includes a bottle gear 90 (FIG. 4) positioned coaxially with the input shaft 74 and freely rotatable relative to the input shaft 74. The idler shaft 78 is permanently meshed with the bottle gear 90, and the bottle gear functions as an output of the transmission 58. In other embodiments, the transmission 58 may not include a bottle gear, and the idler shaft 78 may function as the output 90 of the transmission 58. As will be understood by one of ordinary skill in the art, the output 90 of the transmission 58 is operably coupled to the rear wheel $W_R$ to transmit power and/or torque to the rear wheel $W_R$ (e.g., via a belt of chain drive). The input shaft 74 is coupled to the forward drive system 50 to receive power and/or torque from the internal combustion engine 62. For example, a primary drive (not shown) may couple the input shaft 74 of the transmission 58 to the internal combustion engine 62, as will be understood by one of ordinary skill in the art. The transmission 58 further includes a gear setting or selection mechanism, illustrated as a shift drum 94, that is controllable by the operator to select a desired one of the gear pairs 70 (e.g., a desired forward gear ratio). The gear selection mechanism 94, and thus the transmission 58, is also capable of a neutral position in which no gear pair 70 is selected. When in the neutral position, no idler shaft gear 86 is secured for co-rotation with the idler shaft 78, such that the idler shaft 78 is freely rotatable relative to the input shaft 74 and torque cannot be transmitted from the internal combustion engine 62 to the rear wheel $W_R$. The idler shaft 78 maintains its coupling with the output 90 of the transmission 58 when the transmission 58 is in neutral. In the illustrated embodiment, the gear selection mechanism 94 is manually or electro-mechanically operable such that the transmission 58 functions as a standard or manual transmission. While a transmission 58 having 6 gear pairs is described herein, it should be understood that in other constructions the transmission may have more or fewer gear pairs defining more or fewer forward gear ratios as desired. For example, a transmission may include 3, 4, 5, or 7 forward gear pairs.

With reference to FIGS. 3-6, the reverse drive system 54 includes an electric motor 98 that generates torque to rotate the rear wheel W$_R$ in the reverse direction which, in turn, propels the motorcycle 20 in the reverse direction R. The reverse drive system 54 further includes a reverse drive gear train 102 to transmit torque from the electric motor 98 to the transmission 58 which, in turn, transmits the torque from the electric motor 98 to the rear wheel W$_R$. In the illustrated embodiment, the reverse drive gear train 102 is disposed within a reverse drive housing 106, located outside of the transmission housing 66, and includes a plurality of gears configured to multiply torque from the electric motor 98. The reverse drive housing 106 is coupled to the transmission housing 66. In some embodiments, the reverse drive system 54 is included on the motorcycle 20 when assembled by the manufacturer. In other embodiments, the reverse drive system 54 may be retrofitted onto the motorcycle 20.

With continued reference to FIGS. 3-6, the reverse drive gear train 102 includes at least a drive gear 110 coupled to the electric motor 98 and a driven gear 114 coupled to the drive gear 110. The drive gear 110 is meshed with an output pinion 100 of the electric motor 98 to receive torque therefrom. In the illustrated embodiment, the drive gear 110 includes a torque limiter 112 that allows the drive gear 110 to "slip" via a set of clutch plates of other mechanism when an amount of torque to be transferred is above a set value. The torque limiter 112 may prevent back driving of the electric motor 98 or other damage to the reverse drive system 54. The driven gear 114 is also coupled to the transmission 58 via the idler shaft 78 and is selectively securable for co-rotation with the idler shaft 78 to transmit torque from the electric motor 98 to the transmission 58. The reverse drive gear train 102 of the illustrated embodiment includes the drive gear 110, an idler gear 118 meshed with the drive gear 110, and the driven gear 114 meshed with the idler gear 118. The drive gear 110, the idler gear 118, and the driven gear 114 are permanently meshed. The drive gear 110 is a compound gear supported by a drive gear shaft 122 and including a drive gear input portion 110a and a drive gear output portion 110b. The drive gear input portion 110a is relatively larger than the drive gear output portion 110b (e.g., the drive gear input portion 110a has a higher tooth count than the drive gear output portion 110b) and is meshed with the electric motor 98. In other constructions, the drive gear input portion 110a may be relatively smaller than the drive gear output portion 110b, depending on a desired gear ratio between the electric motor 98 and the transmission 58. The drive gear output portion 110b is secured for co-rotation with the drive gear input portion 110a and is meshed with the idler gear 118. The drive gear input portion 110a and the drive gear output portion 110b may be separately formed gears and coupled for co-rotation via the drive gear shaft 122 to define the compound drive gear 110. In other constructions, the drive gear input portion 110a and the drive gear output portion 110b may be integrally formed and/or connected to one another as a single gear having differently sized portions. The idler gear 118 is also a compound gear and is supported by an idler gear shaft 126. The idler gear 118 thus includes an idler gear input portion 118a and an idler gear output portion 118b. The idler gear input portion 118a is relatively larger than the idler gear output portion 118b (e.g., the idler gear input portion 118a has a higher tooth count than the idler gear output portion 118b), and the idler gear input portion 118a is meshed with the drive gear output portion 110b. In other constructions, the idler gear input portion 118a may be relatively smaller than the idler gear output portion 118b, depending on a design gear ratio between the electric motor 98 and the transmission 58. Similar to the drive gear 110, the idler gear input portion 118a and the idler gear output portion 118b may be formed as separate gears that are secured for co-rotation with the idler gear shaft 126 to form a compound gear, or the idler gear input portion 118a and the idler gear output portion 118b may be integrally formed as a single compound gear. The idler gear output portion 118b is meshed with the driven gear 114, which is coupled to the transmission 58 and selectively securable for co-rotation with the idler shaft 78. In the illustrated embodiment, the drive gear 110, the idler gear 118, and the driven gear 114 remain permanently meshed with one another. The driven gear 114 is positioned to be co-rotatable with the idler shaft 78 of the transmission 58 and is selectively securable for co-rotation with the idler shaft 78. It should be understood that, in other constructions, the reverse drive gear train 102 may include more or fewer gears and the gears may or may not be formed as compound gears based on a desired magnitude of torque multiplication (e.g., gear ratio) between the electric motor 98 and the transmission 58.

With reference to FIGS. 4-9, a reverse drive clutch 130 is disposed between the driven gear 114 and the idler shaft 78 to selectively couple the driven gear 114 for co-rotation with the idler shaft 78 and allow for the transmission of torque to the transmission 58. The clutch 130 is actuatable between a disengaged position, in which the driven gear 114 is rotatable relative to the idler shaft 78 and an engaged position in which the driven gear 114 is secured for co-rotation with the idler shaft 78 such that the reverse drive system 54 is capable of transmitting torque to the rear wheel W$_R$. In some constructions, the clutch 130 may be biased toward the disengaged position. The clutch 130 includes an adapter 134 coupled to the idler shaft 78, a dog ring 138 coupled to the adapter 134, and a shift fork 142 coupled to the dog ring 138. The adapter 134 is secured for co-rotation with the idler shaft 78. The dog ring 138 selectively engages the driven gear 114 to couple the clutch 130 to the reverse drive system 54 (e.g., when the clutch 130 is in the engaged position). The dog ring 138 encircles a portion of the adapter 134, is secured for co-rotation with the adapter 134, and is axially movable along a portion of the adapter 134. As will be described in greater detail herein, the dog ring 138 is movable along the adapter 134 as the clutch 130 moves between the engaged position and the disengaged position.

With reference to FIG. 5, an end of the idler shaft 78 extends beyond the transmission housing 66 to be coupled to the adapter 134. The end of the idler shaft 78 includes a plurality of splines 146. The adapter 134 is generally cylindrical and includes a central aperture 150 extending therethrough. The central aperture 150 includes a splined portion 154 engageable with the splines 146 on the end of the idler shaft 78 to rotatably couple the adapter 134 and the idler shaft 78. The central aperture 150 further includes a shoulder 158 engageable by a fastener 162 to axially secure the adapter 134 to the end of the idler shaft 78. The end of the idler shaft 78 includes a threaded bore 166, and the fastener 162 is a bolt that threadedly engages the bore 166. In the illustrated embodiment, a washer 170 is disposed about the bolt 162 to engage the shoulder 158, such that tightening of the bolt 162 secures the adapter 134 to the end of the idler shaft 78.

Figure 8:
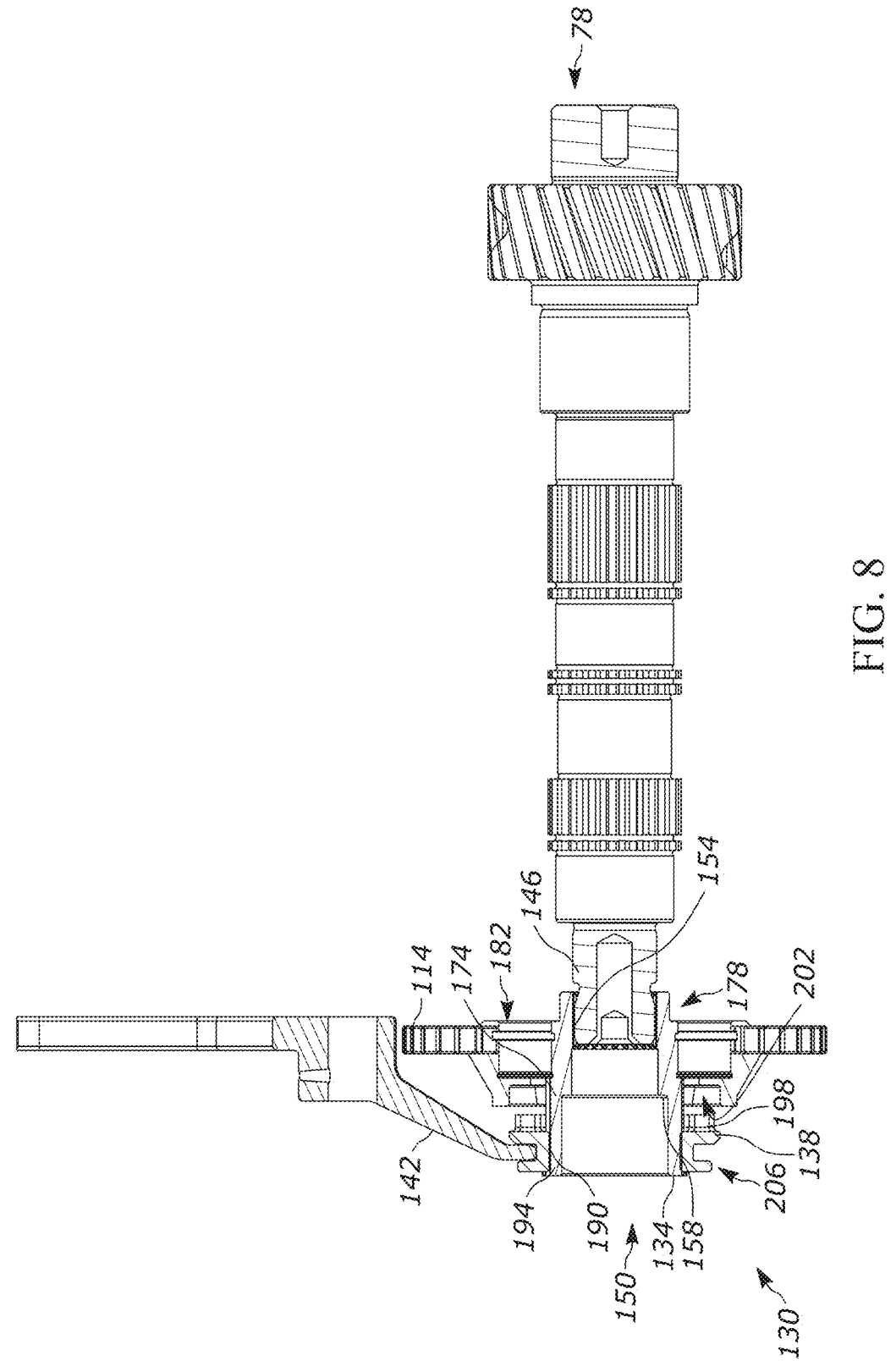
FIG. 8 is a cross-sectional view of the clutch of FIG. 7, taken along section line 8-8 in FIG. 7.
Figure 9:
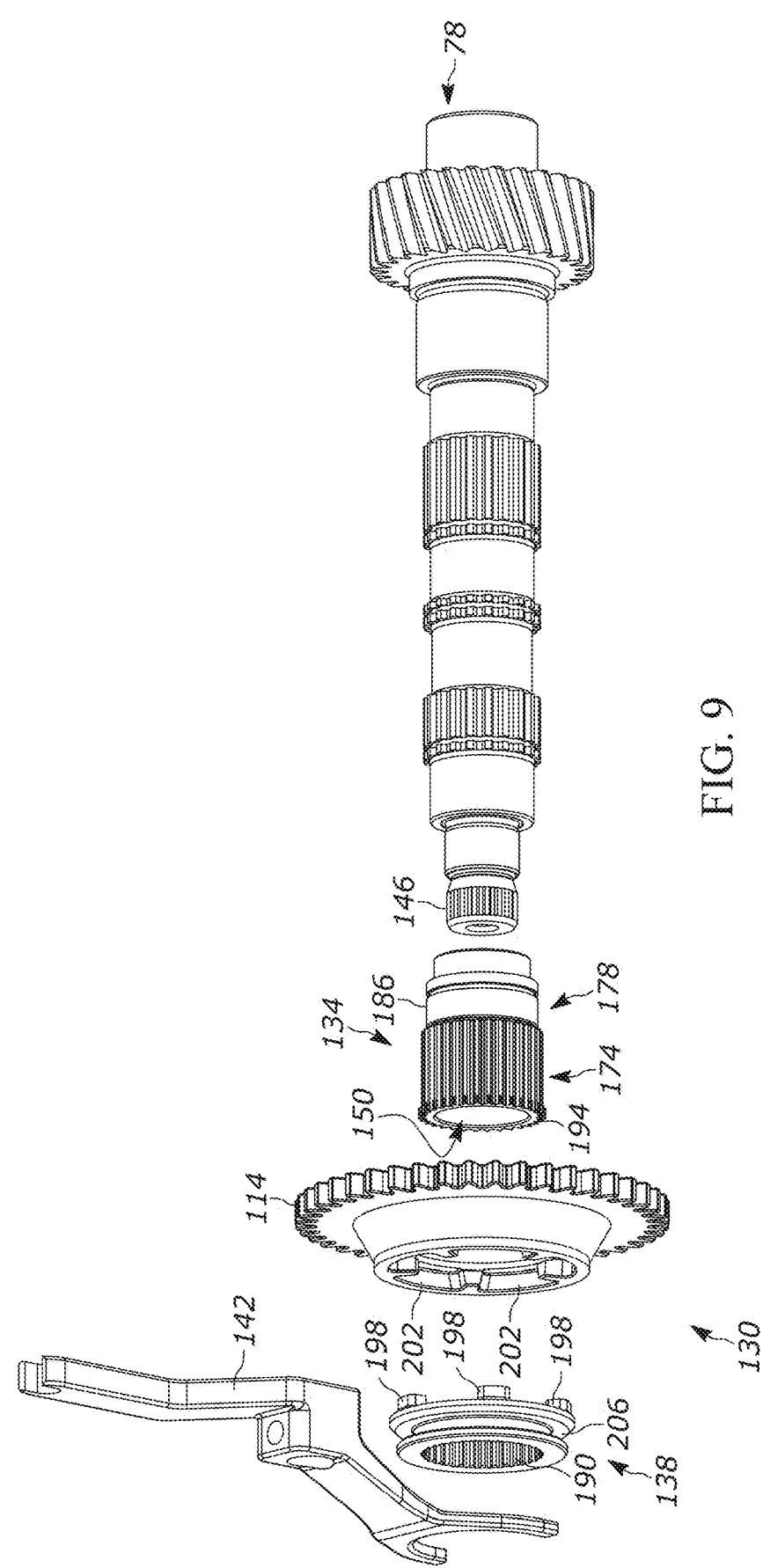
FIG. 9 is an exploded perspective view of the clutch of FIG. 7.

With continued reference to FIGS. 5, 8, and 9, the adapter 134 includes a dog ring support portion 174 and a driven gear support portion 178. The driven gear support portion 178 is disposed closer to the transmission housing 66 than the dog ring support portion 174 when the adapter 134 is coupled to the idler shaft 78. The dog ring support portion 174 is splined, such that the dog ring 138 can be rotationally coupled to the adapter 134. The driven gear support portion 178 is adapted to rotatably support the driven gear 114. In the illustrated embodiment, a bearing assembly 182 is coupled to the driven gear support portion 178 to support the driven gear 114 for rotation relative to the adapter 134, and the driven gear support portion 178 includes a circumferential recess 186 to locate the bearing assembly 182.

With continued reference to FIGS. 5, 8, and 9, the dog ring 138 is coupled to the adapter 134 via the dog ring support portion 174. An inner surface 190 of the dog ring 138 is splined to engage with the splined dog ring support portion 174. Thus, the dog ring 138 is secured to the adapter 134 for co-rotation with the adapter 134 while being axially movable relative to the adapter 134. In the illustrated embodiment, the dog ring support portion 174 includes a stop portion 194 extending radially from an outer end thereof. The stop portion 194 functions to limit the axial extent to which the dog ring 138 is movable along the adapter 134 in a direction away from the driven gear 114. The dog ring 138 further includes a plurality of dog teeth 198 disposed circumferentially about the dog ring 138 and extending axially away from the dog ring 138. The driven gear 114 includes a plurality of dog recesses 202 that are selectively engageable by the dog teeth 198 to rotationally couple the driven gear 114 and the dog ring 138. The dog ring 138 also includes a circumferential recess 206 that is engageable by the shift fork 142. The shift fork 142 is adapted to control a position of the dog ring 138 along the dog ring support portion 174 of the adapter 134. In some embodiments, the shift fork 142 is coupled to the shift drum 94 to be actuated (FIG. 4). In other embodiments, the shift fork 142 is coupled to a dedicated actuator, a linear actuator or solenoid 200 (FIG. 6), to be moved along the length of the adapter 134. The clutch 130 is in the engaged position when the shift fork 142 has moved the dog ring 138 towards the driven gear 114 such that the dog teeth 198 are engaged with the dog recesses 202, and the clutch 130 is in the disengaged position when the shift fork 142 has moved the dog ring 138 away from the driven gear 114 such that the dog teeth 198 are disengaged from the dog recesses 202. The reverse drive system 54 cannot impart rotation on the rear wheel $W_R$ when the clutch 130 is in the disengaged position.

Figure 10:
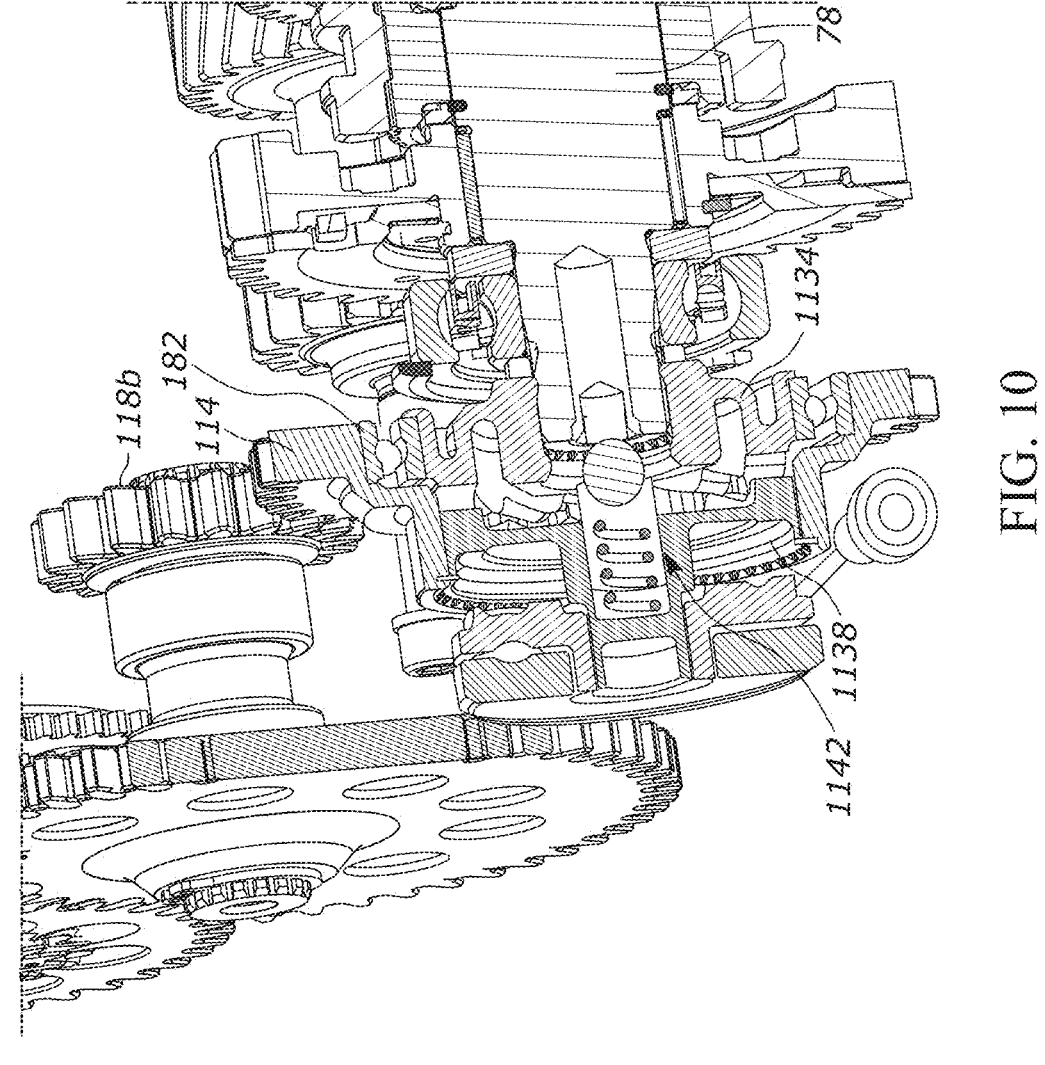
FIG. 10 is a partial cross-sectional view of a portion of a transmission and reverse drive system according to another embodiment of the present disclosure.

FIG. 10 illustrates another embodiment of a reverse drive clutch 1130 with following differences explained below. Rather than an adapter 134 supporting a movable dog ring 138, the reverse drive clutch 1130 includes an adapter, illustrated as a shaft end ratchet nut 1134, coupled to the idler shaft 78. The shaft end ratchet nut 1134 is threaded to an end of the idler shaft 78 in place of the splines 146. The shaft end ratchet nut 1134 rotatably supports the driven gear 114 via a bearing assembly 182, such that the driven gear 114 is rotatable relative to the shaft end ratchet nut 1134 and axially secured relative to the shaft end ratchet nut 1134. A ratchet coupler 1138 is supported within driven gear 114 for co-rotation with the driven gear 114 and translational movement relative to the shaft end ratchet nut 1134. In the illustrated embodiment, a splined connection exists between the driven gear 114 and the ratchet coupler 1138. The ratchet coupler 1138 is movable relative to the shaft end ratchet nut 1134 between an engaged position, in which the coupler

1138 is engaged with the nut 1134 to transmit torque to the nut 1134 and thus to the idler shaft 78, and a disengaged position, in which the ratchet coupler 1138 is spaced from the shaft end ratchet nut 1134 to that torque cannot be transmitted from the driven gear 114 to the idler shaft 78. In the illustrated embodiment, a biasing mechanism 1142 biases the ratchet coupler 1138 toward the disengaged position.

Each embodiment of the reverse drive clutch 130, 1130 as described herein selectively couples the driven gear 114 to the idler shaft 78 to transmit torque to the idler shaft 78. Similarly, each embodiment utilizes axial movement (e.g., of the dog ring 138 or the ratchet coupler 1138) to engage or disengage the clutch 130, 1130. However, the dog ring 130 is rotationally secured to the adapter 134 and axially movable relative to the adapter 134, while the ratchet coupler 1138 is rotationally secured to the driven gear 114 and axially movable relative to the driven gear 114. Thus, the component of the reverse drive clutches 130, 1130 that is movable is oppositely contained in the two embodiments.

Figure 11:
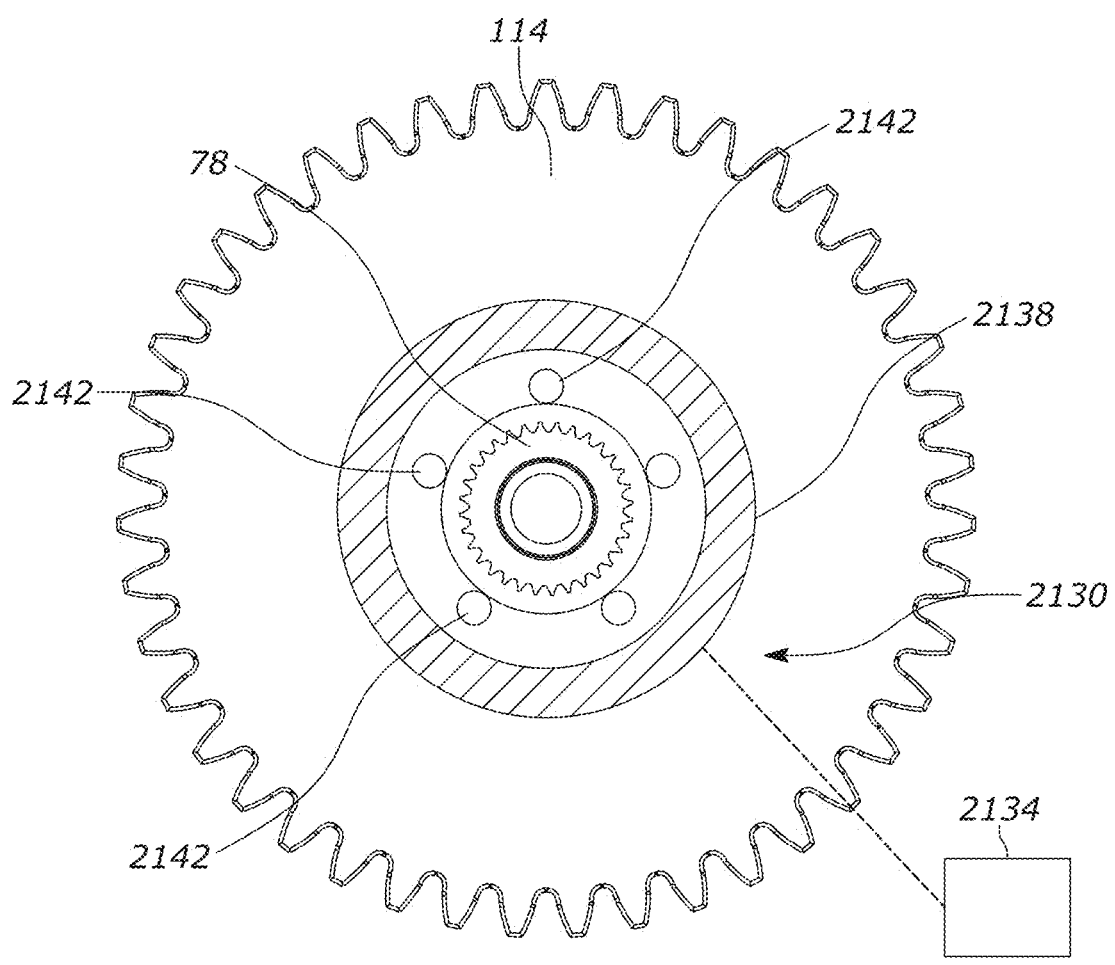
FIG. 11 is a side view of a clutch of the reverse drive system according to another embodiment of the present disclosure.

FIG. 11 illustrates yet another embodiment of a reverse drive clutch 2130, with the following differences explained below. Rather than the mechanical clutch embodiments described above, the reverse drive clutch 2130 is electromagnetically actuated. The electromagnetic reverse drive clutch 2130 includes, among other things, a power source 2134, a coil assembly 2138 operably coupled to the power source, and a magnetic clutch element 2142 (e.g., a plurality of magnetic rollers) movably supported within the reverse drive clutch 2130. The magnetic clutch element 2142 is movable (e.g., radially) between a disengaged position, in which the magnetic clutch element 2142 is disengaged from the driven gear 114 to inhibit torque transmission, and an engaged position, in which the magnetic clutch element 2142 is engaged with the driven gear 114 to transmit torque. Movement of the magnetic clutch element 2142 is induced via the power source 2134 and the coil assembly 2138. More particularly, the power source 2134 is configured to selectively provide electric power to the coil assembly 2138 which, in turn, generates a magnetic field that acts on the magnetic clutch element 2142 to move the magnetic clutch element 2142 towards the engaged position. In some embodiments, the magnetic clutch element 2142 may be biased towards the disengaged position. The electromagnetic reverse drive clutch 2130 is disposed between the driven gear 114 and the idler shaft 78 and, when in the disengaged position, at least a portion of the electromagnetic reverse drive clutch 2130 is rotatable relative to the idler shaft 78 or the driven gear 114.

Referring again to FIG. 1, the powertrain 30 described herein includes two parallel power transmission pathways beginning with the forward and reverse drive systems 50, 54, respectively. A forward drive pathway begins with the internal combustion engine 62 which generates torque to propel the motorcycle 20 in the forward direction F. The torque from the internal combustion engine 62 is then transmitted to the input shaft 74 of the multi-speed transmission, through a selected gear pair 70, and to the output 90 of the transmission 58 to the rear wheel $W_R$ to rotate the rear wheel $W_R$ in a forward direction. A reverse drive path begins at the electric motor 98 which generates torque to propel the motorcycle 20 in the reverse direction R. The torque from the electric motor 98 is transmitted through the permanently meshed gears 110, 118, 114 of the reverse drive gear train 102 and to the idler shaft 78 of the transmission 58 to be outputted to the rear wheel $W_R$ to drive the rear wheel $W_R$ in the reverse direction. The reverse drive clutch 130 is in the engaged position to transmit the torque from the electric motor 98 to the rear wheel W$_R$. The forward drive system 50 and the reverse drive system 54 are prevented from operating simultaneously so as not to damage the motorcycle 20. To operate the forward drive system 50, the reverse drive clutch 130 is disengaged so that the idler shaft 78 of the transmission 58 is freely rotatable relative to the reverse drive gear train 102. Thus, the forward drive system 50 is operable without inadvertently transmitting torque to the reverse drive system 54 which could damage the reverse drive system 54. To operate the reverse drive system 54, the transmission 58 is placed in the neutral position to allow the idler shaft 78 to rotate relative to the input shaft 74, and the reverse drive clutch 130 is in the engaged position to operably couple the reverse drive system 54 to the idler shaft 78 of the transmission 58. When the transmission 58 is in neutral, the reverse drive system 54 is operable to transmit torque to the rear wheel W$_R$ without inadvertently transmitting torque to the internal combustion engine 62 which could damage the internal combustion engine 62 or the reverse drive system 54.

In some embodiments, the electric motor 98 of the reverse drive system 54 functions as both a starter motor for the internal combustion engine 62 and to provide torque for the reverse drive system 54. The electric motor 98 includes a reverse drive end 218 coupled to the reverse drive gear train 102 and a starter end 222 operably coupled to the internal combustion engine 62. The starter end 222 is selectively coupled to the internal combustion engine 62 to rotate the internal combustion engine 62 during a starting operation. In the illustrated embodiment, the starter end 222 includes a bendix style output (not shown) that engages the internal combustion engine 62 during starting and disengages from the internal combustion engine 62 when not starting the internal combustion engine 62. Thus, the starter end 222 is disengaged from the internal combustion engine 62 when the electric motor 98 provides torque for the reverse drive system 54 and does not inadvertently transmit torque to the internal combustion engine 62. Similarly, when starting the internal combustion engine 62, the reverse drive clutch 130 is in the disengaged position to prevent torque from the electric motor 98 to be transmitted to the transmission 58 via the reverse drive system 54.

In the illustrated embodiments, the electric motor 98 may be rotatable in forward and reverse directions. As previously mentioned, it is therefore possible to propel the motorcycle 20 in the forward direction F via the reverse drive system 54. In such an embodiment, the reverse drive system 54 may be considered the auxiliary (e.g., low-speed) operating system and the forward drive system 50 may be considered the standard (e.g., high-speed) operating system. The low-speed operating system allows the operator to maneuver the motorcycle 20 under electric power and at low speeds during parking or other maneuvers. For example, the low-speed operating system may propel the motorcycle 20 in forward or reverse directions at a relatively low rate of speed, in comparison to the high-speed operating system. The low-speed operating system is driven by the electric motor 98 via the reverse drive gear train 102. The low-speed operating system requires the transmission 58 to be in neutral. Therefore, the internal combustion engine 62 may be on or off during operation of the low-speed operating system, without interfering with the low-speed operating system. If the internal combustion engine 62 is on during operation of the low-speed operating system, the internal combustion engine 62 may charge a battery (not shown) that provides power to the electric motor 98 to drive the low-speed operating system thereby extending an amount of time that the low-speed operating system may be used for. The high-speed operating system allows the operator to maneuver the motorcycle 20 at standard operating speeds, for example, when on roadways.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, one having ordinary skill in the art will appreciate that specific features of the numerous embodiments disclosed may be mixed and matched in other ways where not specifically inhibited, even though specific illustration of such embodiments may not be exhaustively covered herein.

Various features and advantages of the disclosure are set forth in the following claims.

What is claimed is:

1. A powertrain for a motorized vehicle including an internal combustion engine configured to drive the motorized vehicle in a forward direction, the powertrain comprising:

a transmission operably coupled to the internal combustion engine to receive torque from the internal combustion engine, the transmission including:

an input shaft configured to receive torque from the internal combustion engine, and an idler shaft having a plurality of gears configured to be meshed with the input shaft, the plurality of gears configured to provide a plurality of selectable forward gear ratios for the motorized vehicle;

a reverse drive system configured to drive the motorized vehicle in a reverse direction, opposite the forward direction, the reverse drive system including:

an electric motor configured to drive the motorized vehicle in a reverse direction, and a reverse drive gear train including a plurality of permanently meshed gears between the electric motor and the transmission; and a clutch operably coupled between the reverse drive gear train and the idler shaft of the transmission, the clutch movable between a disengaged position, in which the idler shaft is prevented from being driven by the electric motor through the reverse drive gear train, and an engaged position in which the idler shaft is configured to be driven a reverse direction by the electric motor through the reverse drive gear train, wherein the transmission includes a transmission housing in which the input shaft and the idler shaft are disposed, and wherein the reverse drive system is disposed outside of the transmission housing.

2. The powertrain of claim 1, wherein the plurality of permanently meshed gears of the reverse drive gear train includes a drive gear coupled to the electric motor, a driven gear selectively connected by the clutch for co-rotation with the idler shaft of the transmission, and an idler gear disposed between the drive gear and the driven gear to transmit torque from the drive gear to the driven gear, wherein at least one of the plurality of permanently meshed gears is a compound gear having an input portion and an output portion, and wherein the input portion is relatively larger than the output portion.

3. The powertrain of claim 1, wherein the electric motor is configured as a starter motor to start the internal combustion engine.

4. The powertrain of claim 1, wherein the clutch includes:

an adapter coupled to the idler shaft, and a dog ring disposed about the adapter and movable relative to the adapter, the dog ring including a plurality of dog teeth configured to couple a final gear of the plurality of permanently meshed gears for co-rotation with the dog ring.

5. The powertrain of claim 4, wherein the dog ring is axially movable relative to the adapter, and wherein the dog ring is coupled for co-rotation with the adapter.

6. A motorized vehicle comprising:

a multi-speed transmission operably coupled to a drive wheel of the motorized vehicle, the multi-speed transmission including a plurality of forward gears configured to be selectively engaged to drive the motorized vehicle at a selected gear ratio;

an internal combustion engine selectively coupled to the multi-speed transmission and configured to provide torque to the multi-speed transmission to drive the motorized vehicle in a forward direction at the selected gear ratio; and a reverse drive system selectively coupled to the multi-speed transmission and configured to provide torque to the multi-speed to the multi-speed transmission to drive the motorized vehicle in a reverse direction, the reverse drive system including:

an electric motor, and a reverse drive gear train configured to be selectively coupled to the multi-speed transmission to transfer torque from the electric motor to the drive wheel of the motorized vehicle, the reverse drive gear train including a plurality of permanently meshed gears between the electric motor and the multi-speed transmission, wherein the multi-speed transmission includes a neutral position in which the internal combustion engine is decoupled from the multi-speed transmission and freely rotatable relative to the multi-speed transmission, wherein the reverse drive gear train is configured to be operably coupled to the multi-speed transmission when the multi-speed transmission is in the neutral position, such that the reverse drive system is operable to drive the motorized vehicle in a reverse direction without interference from the internal combustion engine, and wherein the multi-speed transmission includes a transmission housing in which the plurality of forward gears are disposed, and wherein the reverse drive system is disposed outside of the transmission housing.

7. The motorized vehicle of claim 6, wherein the reverse drive system is disposed within a reverse drive housing, and wherein the reverse drive housing is coupled to the transmission housing.

8. The motorized vehicle of claim 6, further comprising a clutch disposed between the reverse drive gear train and the multi-speed transmission.

9. The motorized vehicle of claim 6, wherein the multi-speed transmission includes an input shaft and an idler shaft, wherein the idler shaft is freely rotatable relative to the input shaft when the multi-speed transmission is in the neutral position.

10. The motorized vehicle of claim 9, wherein the reverse drive gear train is configured to be selectively coupled to the idler shaft to transfer torque from the electric motor to the drive wheel of the motorized vehicle.

11. The motorized vehicle of claim 6, wherein the plurality of permanently meshed gears of the reverse drive gear train includes a drive gear coupled to the electric motor, a driven gear selectively connected by the clutch for co-rotation with a shaft of the multi-speed transmission, and an idler gear disposed between the drive gear and the driven gear to transmit torque from the drive gear to the driven gear, wherein at least one of the plurality of permanently meshed gears is a compound gear having an input portion and an output portion, and wherein the input portion is relatively larger than the output portion.

* * * * *